United States Patent

[11] 3,576,570

[72] Inventor Howard L. Meier
Prescott, Wis.
[21] Appl. No. 783,261
[22] Filed Dec. 12, 1968
[45] Patented Apr. 27, 1971
[73] Assignee Sperry Rand Corporation
New York, N.Y.

[54] SYNCHRONOUS TIMING SCHEME FOR A DATA PROCESSING SYSTEM
5 Claims, 9 Drawing Figs.

[52] U.S. Cl. .......... 340/172.5
[51] Int. Cl. .......... G06f 3/04
[50] Field of Search .......... 307/208, 269; 328/72; 340/172.5; 235/157

[56] References Cited

UNITED STATES PATENTS

| | | | |
|---|---|---|---|
| 3,139,607 | 6/1964 | Grodin | 340/172.5 |
| 3,274,559 | 9/1966 | Giroux et al. | 340/172.5 |
| 3,373,418 | 3/1968 | Chan | 340/172.5 |
| 3,394,355 | 7/1968 | Sliwkowski | 340/172.5 |
| 3,435,424 | 3/1969 | Schira et al. | 340/172.5 |

*Primary Examiner*—Paul J. Henon
*Assistant Examiner*—Sydney Chirlin
*Attorneys*—Kenneth T. Grace, Thomas J. Nikolai and John P. Dority

ABSTRACT: A scheme for synchronizing the transfer of information signals between a Line Terminal and an associated Modem at a computer site of a data processing system. The scheme involves the addition of a logical circuit, termed the Synchronous Timing Assembly, to an already existing Line Terminal. The added Synchronous Timing Assembly resynchronizes the Line Terminal generated receive clock signal each time two incoming information signals, such as a Mark signal and a Space signal that are received sequentially from the Modem, differ in state. Additionally, the Synchronous Timing Assembly enables the Line Terminal to discriminate between valid and invalid information signals by dropping out all information signals not meeting established criteria.

INVENTOR
HOWARD L. MEIER
BY Kenneth T. Grace
ATTORNEY

= "0" = GND = NEG. SIGNAL = MARK

= "1" = +6V = POS. SIGNAL = SPACE

SYNCHRONOUS TIMING SCHEME FOR A DATA PROCESSING SYSTEM

BACKGROUND OF THE INVENTION

The present invention is directed toward a multicomputer data processing system operating in real time wherein a plurality of independently operable Remote Computers, at a plurality of Remote Sites, communicate with an independently operable Central Computer at a Central Site. Each of the computer sites includes a Computer, one or more Input/Output (I/O) Devices and a Data Communication Subsystem (DCS) which couples the associated Computer to a plurality of communication links or Transmission Lines. The Data Communication Subsystem includes a Line Terminal Controller (LTC) for communication with the associated Computer, and a plurality of parallel arranged Input/Output Line Terminal (LT) pairs. Generally, intermediate each Line Terminal and the associated Transmission Line are a Modem and a Communication Interface (CI) for providing the necessary adjustment of the particular message type to the particular associated Transmission Line type.

The Line Terminals are logic packages designed to perform simplex data communication via a communication path such as a telegraph or a telephone line or other communication facility. Receive and transmit, input and output, Line Terminals may be interconnected in pairs to provide half, or full duplex communication where required. A wide variety of Line Terminals may be provided to accommodate communication over most available communication facilities and methods. Thus, each Line Terminal is particularly adapted for its associated Transmission Line type. For a more detailed discussion of such available communication methods see the copending U.S. Pat. application, Ser. No. 733,544, filed May 31, 1968, to R. C. Jablonski, assigned to the Sperry Rand Corporation as is the present invention.

Generally speaking, the multicomputer data processing system into which the present invention is incorporated operates in real time whereby a transmitting Computer accepts its information on its associated Input/Output device, transmits its information in a character serial, character bit parallel message format to its associated Data Communication Subsystem whereby such message, in accordance with the particular type of transmission intended, is gated to a particular Line Terminal, and perhaps an associated Modem and Communication Interface, whereupon the message is transmitted over its associated Transmission Line in a character serial, character bit serial message format. A similar arrangement exists at the receiving Computer whereby the associated Line Terminal and perhaps an associated Modem and Communication Interface, reconverts the receiving information from the character serial, character bit serial message format to the character serial, character bit parallel message format. Message transmission between Computer Sites may be in the synchronous or asynchronous mode, the present invention being directed toward synchronous message transmission.

SUMMARY OF THE INVENTION

The present invention involves the addition of a Synchronous Timing Assembly to an existing Line Terminal. The Synchronous Timing Assembly is comprised of an input signal means for receiving, from the associated Modem, incoming binary information input signals, such as a Mark signal and a Space signal each input signal theoretically being of 1-bit length in duration, a ½-bit delay probe means that is driven by the input signals for generating associated ½-bit delay probes and a delayed input signal means that is AND driven by both the input signals and the delay probe. The input signals and the so-generated delay probes are AND'ed at the delayed input signal means for dropping out all input signals that are not at least ½-bit length in duration, e.g., such as noise signals. Additionally, there is included a synchronizing means that is driven by the delayed input signal means for synchronizing the receive clock signals of an included transmit, receive clock signal generating means. The receive clock signals, in turn, provide timing for the associated input Line Terminal to which the delayed input signal is also coupled. The transmit clock signals are coupled to the associated output Line Terminal for transmission of information signals from the Line Terminal to the Modem and thence out the associated Transmission Line.

DESCRIPTION OF THE PREFERRED EMBODIMENT

Figure 1:
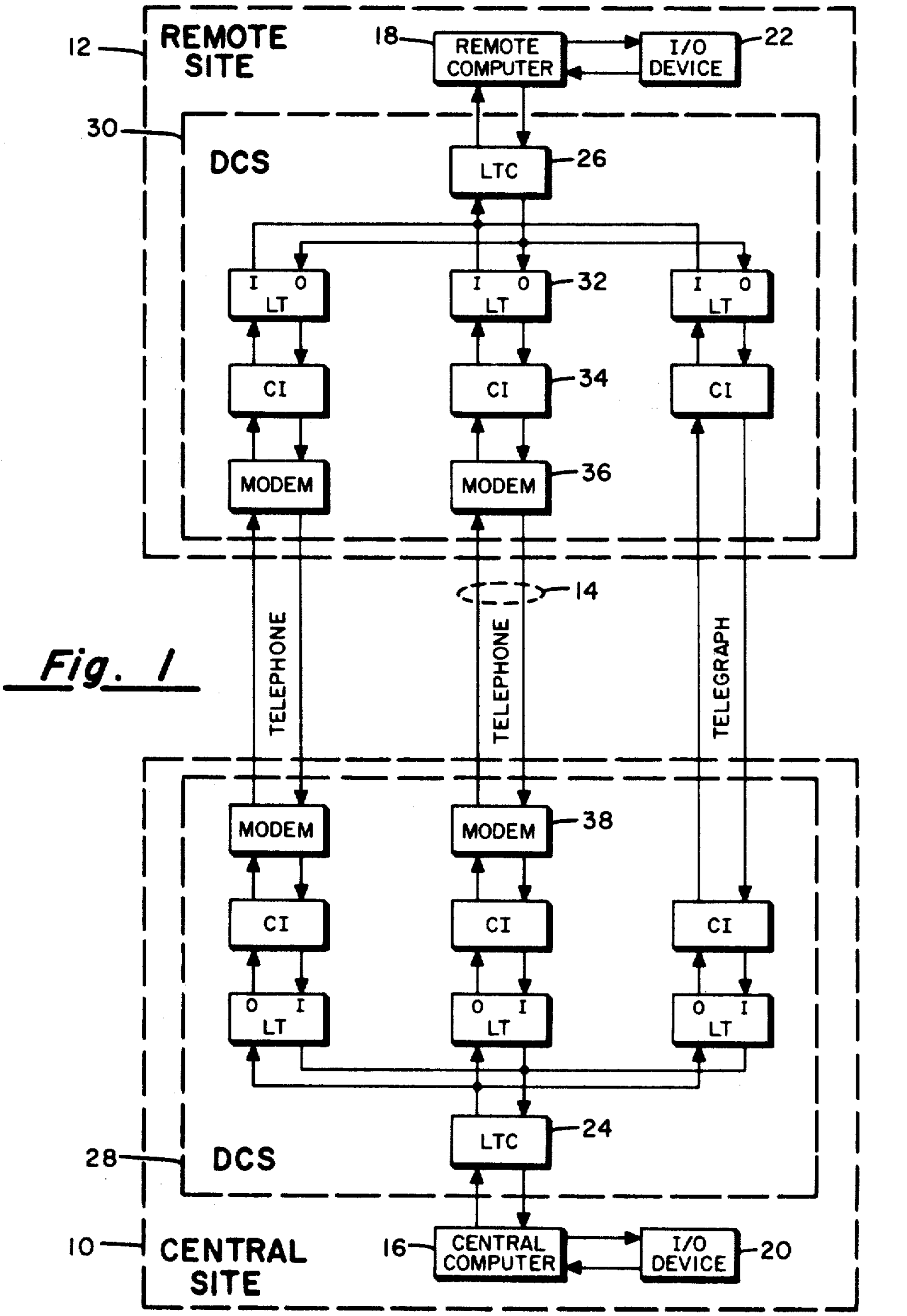
FIG. 1 is a block diagram of a data processing system in which the present invention is incorporated.

With particular reference to FIG. 1 there is presented an illustration of a block diagram of a data processing system incorporating the present invention. The data processing system of FIG. 1 includes a plurality of Remote Computers, at a plurality of Remote Sites, that communicate with each other and with a single Central Computer, at a single Central Site, over respectively associated communication links comprised of a variety of Transmission Line types. Transmission is bidirectional whereby each independently operable computer has selective ready access, on a real time basis, to each of the other independently operable computers. Such a system may be similar to that of the above referenced patent application of R. C. Jablonski.

The illustrated embodiment of FIG. 1 is broadly composed of a plurality of computer sites; Central Site 10, Remote Site 12, it being understood that only two sites 10, 12 are illustrated for purposes of simplifying the discussion of the present invention. For purposes of further clarifying the discussion of the present invention, site 10 is denoted as Central Site 10 which may be coupled to a plurality of Remote Sites 12, each of which may be intercoupled to each other. Broadly speaking, all of the sites 10, 12 may be of substantially similar equipment makeup except for variations in their Line Terminal requirements due to the peculiarities of the associated message and Transmission Line requirements. As an example, in the illustrated embodiment, sites 10, 12 may each include a Univac 9400 Computer which is coupled to a plurality of different Input/Output Devices 20, 22 such as a: card punch/reader, magnetic tape unit, line printer, typewriter, magnetic drum, magnetic disc, paper tape punch/reader, etc. Central Computer 16 and Remote Computer 18 may, in turn, be coupled to substantially similar Data Communication Subsystems 28, 30 each of which may have substantially similar conformations except for minor variations in Line Terminal requirements due to the peculiarities of the individual transmit/receive requirements. Accordingly, Data Communication Subsystems 28, 30 may include substantially similar Line Terminal Controllers 24, 26 each of which may be a Univac DCS–16 free standing Line Terminal Controller, each of which may accommodate up to 16 Line Terminals and their associated Transmission Lines.

Each Line Terminal Controller 24, 26 of the associated Data Communication Subsystem 28, 30 may be coupled in parallel to up to 16 Line Terminals and their associated Transmission Lines with the information that is to be transmitted being gated into only one of the parallel arranged Line Terminals. Each Line Terminal includes a transmit and receive, output and input, unit interconnected in a pair to provide half or full duplex communication as required. Such communication may be selectively by simplex or duplex data transmission via a communication path such as a telegraph or telephone line or other communication facility. The wide variety of transmit and receive Line Terminals provides features and selections appropriate for communication via most available communication facilities and methods. Such Line Terminals are generally classified by speed and method of communication.

The Line Terminals are generally coupled from their Communication Interface to the associated Transmission Line by a Modem which is a standard item of a Bell Telephone Company Data Communication System, and, consequently, no detailed discussion of the operation of such Modems shall be given herein. For purposes of the present invention it is sufficient to state that each Modem couples a frequency modulated signal to its associated Transmission Line as a function of a binary signal input, and, conversely, couples a binary signal output to its associated Line Terminal as a function of a frequency modulated signal received from its associated Transmission Line.

Intermediate each Line Terminal and its associated Modem and/or Transmission Line is a Communication Interface which performs logic and electrical matching functions to convert signals between the Line Terminal and the associated Modem and/or Transmission Line. A Communication Interface may provide strapping selections which permit operation in simplex, half duplex or full duplex modes. Additionally, it may provide continuous carrier or control carrier for private line systems as well as control carrier for Data Phone service and unattended answering of Data Phone service calls and termination of such calls. The interface between the Line Terminal Controller and the associated Transmission Lines may be any one of several of many well-known types, the associated elements and typical uses may be as noted in the above referenced patent application of R. C. Jablonski.

Although many various system and equipment arrangements are possible within the multicomputer data processing system illustrated in FIG. 1 only one typical system shall be discussed as an implementation of the present invention. For purposes of the present discussion Central Site 10 and Remote Site 12 may be considered to be transmit/receive communication systems having substantially similar conformations intercoupled by a Transmission Line 14. Remote Site 12 includes Remote Computer 18 which is a Univac 9400 Computer, a plurality of Input/Output Devices 22 and a Data Communication Subsystem 30, which may be a Univac Data Communication Subsystem T8575—01/03. Data Communication Subsystem 30 includes a Line Terminal Controller 26, which is a Univac DCS-16 Controller, a transmit/receive Line Terminal 32 which is a Univac feature number F1005–02,03, a Communication Interface 34, which is a Univac feature number F1002–03 and a Modem 36, which is a Bell Data Set 202D. Central Site 10 and its corresponding component parts are similar to their corresponding counterparts in Remote Site 12. Transmission Line 14, which couples Modem 36 of Remote Site 12 to Modem 38 of Central Site 10 is a four-wire transmission line system leased from the Bell Telephone Company system and includes at least two transmission line portions implemented by a Bell System 758C Data Switcher. This communication system is a duplex, synchronous real time communication link transmitting data at a data rate of 1,800 bits per second (baud) (simplex) in a bit serial format.

OPERATION

Figure 2:
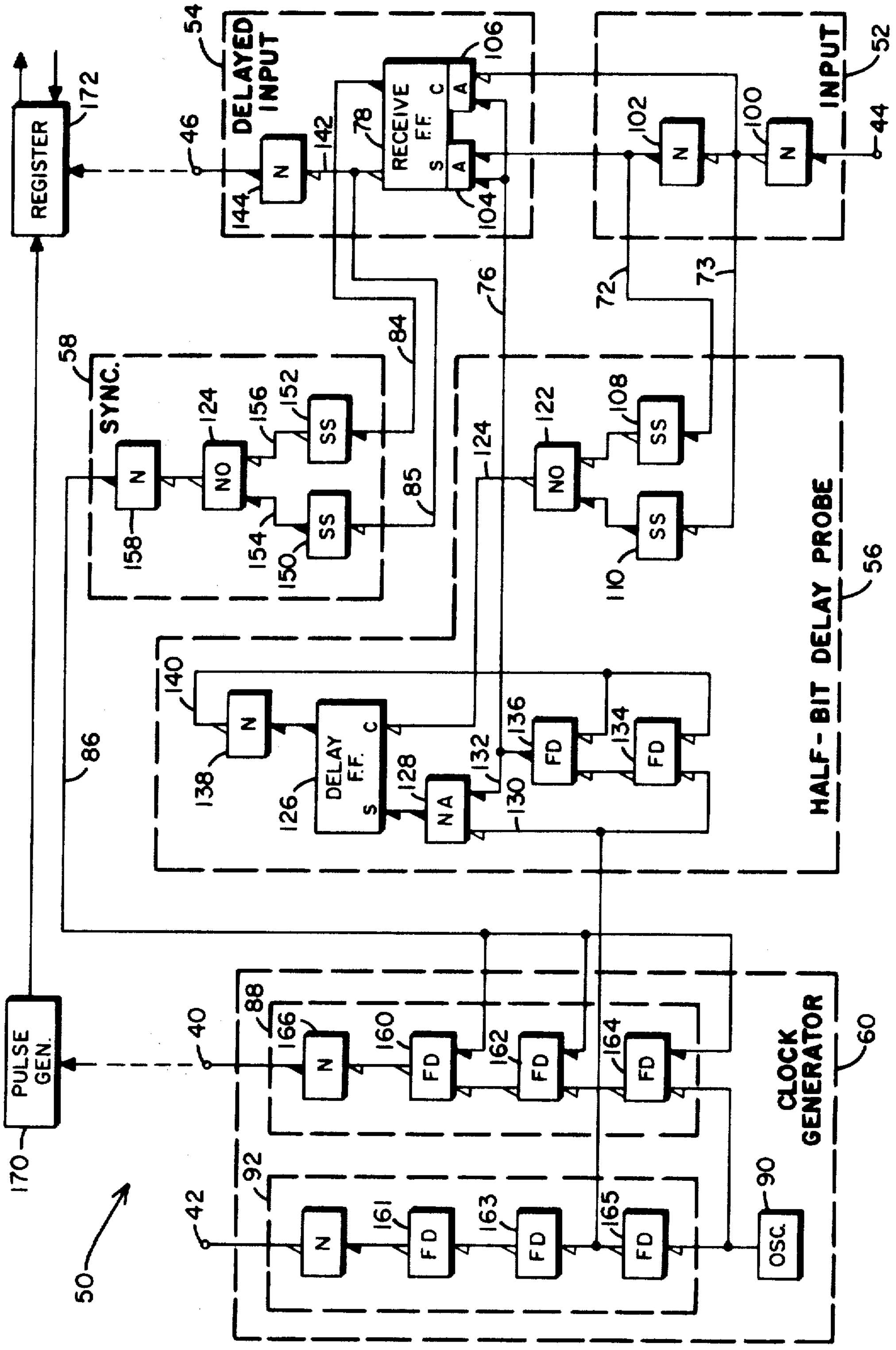
FIG. 2 is a block diagram of the preferred embodiment of the present invention.

As stated above the present invention involves the addition of a logical circuit, termed the Synchronous Timing Assembly, to an already existing Line Terminal. With particular reference to FIG. 2 there is presented an illustration of a block diagram of the preferred embodiment of the synchronous Timing Assembly 50 of the present invention incorporated within Line Terminal 32 of Remote Site 12 of FIG. 1. Synchronous Timing Assembly 50 essentially consists of input signal means 52, delayed input signal means 54, ½-bit delay probe means 56, synchronizing signal means 58, and clock signal generating means 60. Clock signal generating means 60 provides, as output signals, a receive clock signal 62 on receive clock signal terminal 40 which signal is coupled to the associated input portion of Line Terminal 32 for synchronizing the receive clock with the delayed input signal to line terminal 32 of Remote Site 12 and a transmit clock signal 64 on transmit clock signal terminal 42 which signal is coupled to the associated output portion of Line Terminal 32 for transmission of information signals from Line Terminal 32 to Modem 36 and thence out the associated Transmission Line 14.

Figure 3:
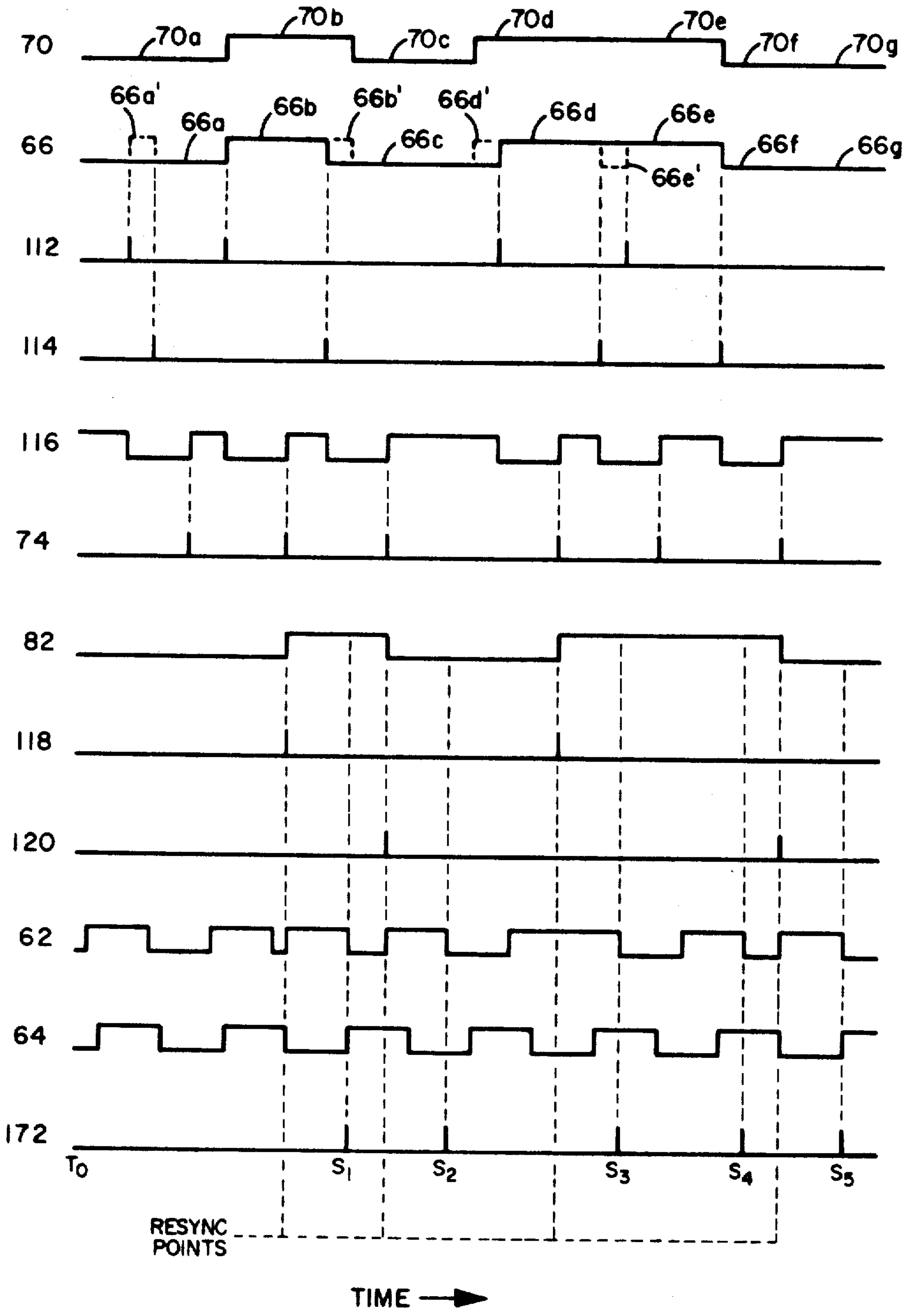
FIG. 3 is an illustration of the waveforms of the signals associated with the embodiment of FIG. 2.
Figure 4A:
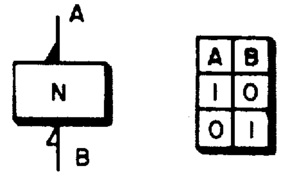
FIGS. 4*a*, 4*b*, 4*c*, 4*d*, 4*e* and 4*f* are block diagrams and their associated truth tables, of the logic circuits utilized in FIG. 2.
Figure 4B:
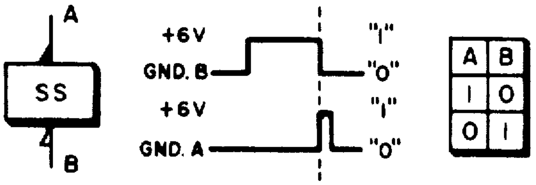
Figure 4C:
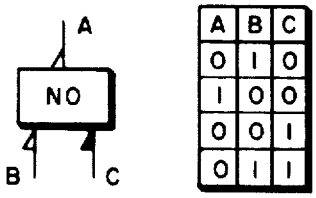
Figure 4D:
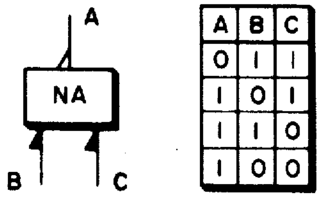
Figure 4E:
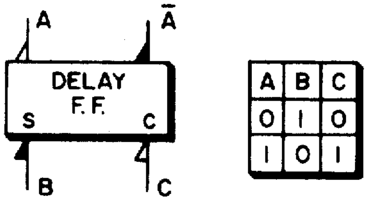
Figure 4F:
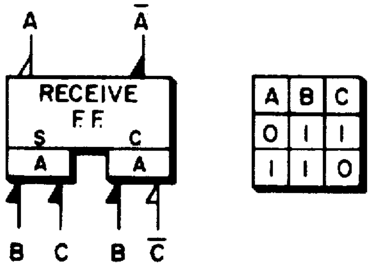

With particular reference to FIG. 3 there is presented an illustration of the waveforms of the signals associated with the illustrated embodiment of FIG. 2. The operation of synchronous Timing Assembly 50 of FIG. 2, with particular reference to the associated waveforms of FIG. 3, may be described as generally operating in the following manner. An input signal 66 as received from Modem 36, and of course the intervening Communication Interface 34, is coupled to input terminal 44 of input signal means 52. Input signal 66 consists of a series of two voltage levels, 0 volts, or ground, and +6 volts, and is the distorted representation of the theoretical signal 70 which theoretical signal 70 consists of serialized Mark signals of a voltage level of approximately 0 volts and Space signals of a voltage level of approximately +6 volts, each Mark and Space signal theoretically being of 1-bit length in duration. The distorted input signal 66 may be considered to be the result of the distorting effect of the communication system of FIG. 1, including Transmission Line 14, upon the theoretical signal 70 as transmitted from Modem 38 of Central Site 10 to Modem 36 of Remote Site 12. Such distorting effects include noise burst 66*a*' on Mark signal 66*a*, noise burst 66*e*' on Space signal 66*e*, end distortion 66*b*' which cuts off the trailing edge of Space signal 66*b* and end distortion 66*d*' which cuts off the leading edge of Space signal 66*d*.

The true and the complement signals of input signal 66 on lines 72, 73 control ½-bit delay probe means 56 which is driven by clock signal generator means 60. This generates a ½-bit delay probe 74 which on line 76 is AND'ed with input signal 66 at receive FF 78 of delayed input signal means 54 providing on output terminal 46 delayed input signal 82 which has been delayed ½-bit time with respect to input signal 66 and has dropped out all portions, e.g., noise bursts 66*a*' and 66*e*', of input signal 66 that are not at least ½-bit length in duration.

The true and the complement signals of delayed input signal 82 on lines 84, 85 control synchronizing signal means 58, the output of which on line 86 controls receive clock signal generator means 88 by clearing the signal divider stages to a positive receive clock signal 62 at terminal 40. When the receive clock signal generator means 88 is properly synchronized, delayed input signal 82 is gated from delayed input signal means 54, terminal 46 into the input register of LT 32 by the first negative excursion of terminal 40 which follows synchronization. This resynchronization of the receive clock signal means 88, and, accordingly, the delayed input signal 82, occurs each time receive FF 78 of delayed input signal means 54 changes state.

In the illustrated embodiment of the present invention, clock signal generator means 60 is comprised of an oscillator 90 that drives receive clock signal generator means 88 and transmit clock signal generator means 92 which, in turn, include a plurality of Frequency Dividers 160—165. Frequency Dividers 160—165 each divide their input clock signal by 16, providing at their respective output terminals 40, 42 clock signals of 1,800 baud of ground and of +6.0 volts signal levels.

DATA/NONDATA SIGNAL DISCRIMINATION

Prior to the coupling of input signal 66 to input terminal 44, Synchronous Timing Assembly 50 is set in an initial ready condition: all logic elements are master cleared and oscillator 90 is driving receive clock signal generator means 88 and transmit clock signal generator 92 causing the associated receive clock signal 62 and transmit clock signal 64 to be coupled to the respective receive clock signal terminal 40 and transmit clock signal terminal 42.

At time $t_0$ input signal 66 is coupled to input terminal 44. Input signal 66, through Inverters 100, 102, causes its true and complement signals to be coupled to the input AND gates 104, 106, respectively, of Receive FF 78 and to Single Shots 108, 110 of ½-bit delay probe means 56. The positive pulses of output signals 114, 112 of Single Shots 108, 110, respectively, are produced upon the coupling of the negative going portion of their respective input signals, which with the true and complement of signal 66 being coupled to Single Shots 108, 110, causes Single Shots, 110, 108 to emit the positive output pulses of signals 112, 114 at the leading and trailing edges, respectively, of a positive going portion of input signal 66. The output signals of Single Shots 110, 108 are ORed at OR gate 122, the output of which on line 124 is coupled to the clear input of Delay FF 126.

Delay FF 126, on its set input, is driven by positive AND Inverter 128 which is driven on a first input 130 by transmit clock signal generator means 92, and on its second input 132 by cascaded Frequency Multipliers 134, 136 which, in turn, are driven by transmit clock signal generator means 92 and which are cleared by the output of Inverter 138 through line 140, i.e., signal 116, as determined by the set output of Delay FF 126. The set output of Delay FF 126 through Inverter 138 and line 140, i.e., signal 116, forces Frequency Multipliers 134, 136 to a cleared state (positive voltage on line 140). On each clearing of Delay FF 126, a signal 74 follows a ½-bit time later on line 76, 132, provided the previous clear pulse occurred at least a ½-bit time earlier.

Signal 74 on line 76 is used as a probe pulse on the input AND gates 104, 106 of Receive FF 78. Signal 74 consists of a series of positive pulses caused by each change of state at terminal 44 (providing the previous state change did not occur within the last ½-bit time) but delayed ½-bit time by ½-bit delay probe means 56. The change of state at terminal 44 which produced signal 74 must still exist at the end of a ½-bit time in order to change the state of Receive FF 78. All state changes with a duration of less than a ½-bit time are treated as nondata, or invalid, signals as compared to all other state changes of signal 66 on input terminal 44 that are greater than ½-bit time in duration and which are considered to be data, or valid, signals.

The output of Receive FF 78 through line 142 and Inverter 144 couples to output terminal 46 the delayed input signal 82 which delayed input signal 82 is input signal 66 delayed ½-bit time but cleared of all invalid data signals, i.e., noise bursts 66a' and 66e', and, accordingly, is equal to the heavy outline of input signal 66 delayed ½-bit time.

RECEIVE CLOCK SIGNAL SYNCHRONIZATION

Each time Receive FF 78 changes state Single Shot 150 or Single Shot 152, by way of line 154 or 156, respectively, couple the positive pulses of their associated output signals 118 or 120 to positive OR inverter 124. Cascaded positive OR Inverter 124 and Inverter 158 pass the positive pulses of signals 118, 120 and on line 86 couple such positive pulses to Frequency Dividers 160, 162, 164 of receive clock signal generator means 88. Each positive pulse on line 86 clears Frequency Dividers 160, 162, 164 causing Frequency Divider 160, through Inverter 166, to assume or remain in a positive state receive clock signal 62 on receive clock signal terminal 40. This clearing of Frequency Divider 160 and the resultant positive state of receive clock signal 62 on receive clock signal terminal 40 is a resynchronizing of the receive clock signal 62 upon each change of state of Receive FF 78. As it requires ½-bit time for Frequency Dividers 162, 164 to reset Frequency Divider 160, the receive clock signal generator means 88 will always emit a positive state for ½-bit time immediately following a change of state of Receive FF 78 followed by a negative going excursion.

Receive clock signal 62 may be utilized to drive a pulse generator 170 which generates strobe signal 172. Strobe signal 172 consists of a series of positive strobe pulses, one strobe pulse generated every time receive clock signal 62 is a negative going signal. Strobe signal 172 strobes delayed input signal 82 in register 172 at strobe times $s_1$, $s_2$, $s_3$, $s_4$, $s_5$ causing the associated logical 1, 0, 1, 1, 0 to be stored in register 172.

With particular reference to FIGS. 4a—4f there are illustrated the logic circuit types and their associated truth tables that are utilized in the description of the illustrated embodiment of the present invention. The circuits are well-known, are commercially available, and, accordingly, should not be described in detail since this would not add to an understanding of the present invention. It is, of course, understood that other types of logic configurations could be utilized in implementing the present invention; those shown herein have been found to be advantageous, both with regard to cost and operation. In the description of the operation of illustrated embodiment certain logic configurations have been assumed. In this regard, a closed arrow shall be equivalent to a +6.0 volt signal which shall be equivalent to a logical 1 and representative of a positive signal while an open arrow shall be equivalent to a ground signal which shall be equivalent to a logical 0 and representative of a negative signal.

With respect to the illustrated logic circuit types all open arrow inputs are at a negative signal level and all closed arrow inputs are at a positive signal level. Additionally, some logic circuit types, e.g., Inverter 144 may include additional driving, i.e., fan out, capabilities as required by the particular use. With respect to the illustrated flip-flop logic circuit types, the flip-flops are shown in the set condition with the associated truth tables reflecting an initial clear condition: left-hand input side enabled produces a 0 at the left-hand output side for a set condition on the Receive FF 78 right-hand input side enabled produces a 1 at the right-hand output side for a clear condition of the Delay FF 126. Thus, it is apparent that there has been described and illustrated herein a preferred embodiment of the present invention that provides an improved scheme for transferring information signals between a Line Terminal and an associated Modem at a computer site of a data processing system.

I claim:

1. In an apparatus for synchronizing the transfer of binary information, the combination comprising:
input signal means for receiving an input signal of first and second input signal levels and of 1-bit length in duration;
delayed input signal means for transmitting a delayed input signal of first and second delayed input signal levels and of 1-bit length in duration;
transmit clock signal generator means for generating a transmit clock signal;
½-bit delay probe generator means;
means coupling said transmit clock signal generator means to said ½-bit delay probe generator means and means coupling said input signal means to said ½-bit delay probe generator means for generating a ½-bit delay probe signal;
means coupling said ½-bit delay probe signal and said input signal to said delayed input signal means for causing said delayed input signal means to generate a delayed input signal whose signal levels that correspond to corresponding input signal levels are delayed ½-bit time.

2. The combination of claim 1 further including:
receive clock signal generator means for generating a receive clock signal;
synchronizing signal means;
means coupling said delayed input signal means to said synchronizing signal means for generating a synchronizing signal;
means coupling said synchronizing signal to said receive clock signal generator means for clearing said receive clock signal generator means and for synchronizing said receive clock signal with said delayed input signal.

3. The combination of claim 2 further including an oscillator means for driving said transmit clock signal generator means and said receive clock signal generator means and generating transmit clock signals and receive clock signals of first and second clock signal levels each of ½-bit length in duration.

4. The combination of claim 3 wherein said means coupling said ½-bit delay probe signal and said input signal to said delayed input signal means includes a receive FF which changes state every time said ½-bit delay probe signal and said input signal which produced the ½-bit delay probe signal are coincident at the end of a ½-bit time.

5. In an apparatus for synchronizing the transfer of binary information, the combination comprising:

input signal means for receiving an input signal of first and second input signal levels;

delayed input signal means coupled to said input signal means for transmitting a delayed input signal, of first and second delayed input signal levels, that is representative of said input signal;

oscillator means including:

transmit clock signal generator means for generating a transmit clock signal; and receive clock signal generator means for generating a receive clock signal;

½-bit delay probe generator means driven by said transmit clock signal generator means for generating a ½-bit delay probe signal;

means coupling said ½-bit delay probe signal and said input signal to said delayed input signal means for causing said delayed input signal means to transmit delayed input signal representations of said input signal that are at least ½-bit length in duration.